June 11, 1963  M. A. CASE  3,093,386
COLLAPSIBLE BOAT AND MOTOR MOVER
Filed Nov. 21, 1960  2 Sheets-Sheet 1
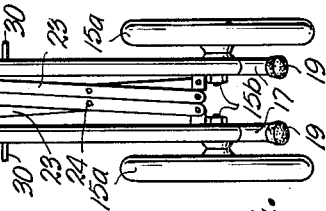
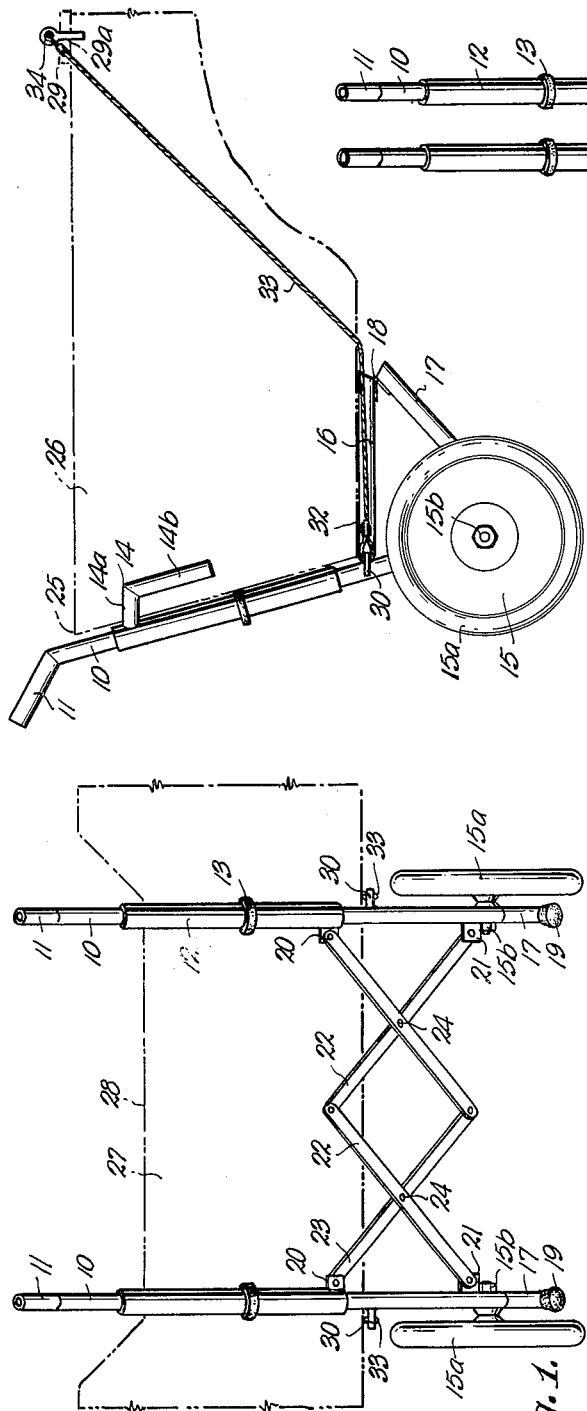
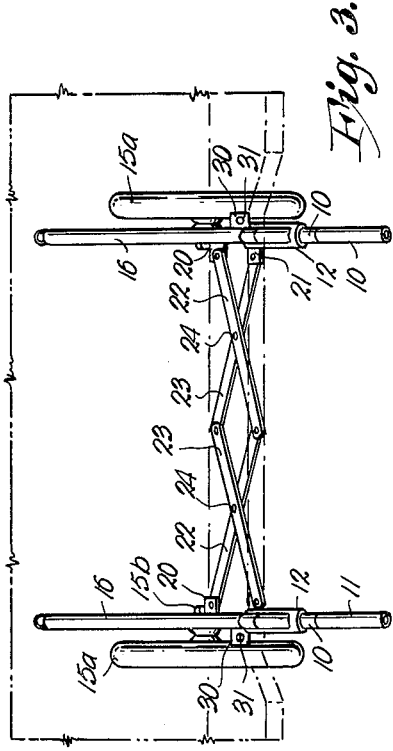
INVENTOR.
Morris A. Case
BY
ATTORNEY.

June 11, 1963  M. A. CASE  3,093,386
COLLAPSIBLE BOAT AND MOTOR MOVER
Filed Nov. 21, 1960  2 Sheets-Sheet 2

INVENTOR.
Morris A. Case
BY
ATTORNEY.

United States Patent Office 3,093,386
Patented June 11, 1963

3,093,386
COLLAPSIBLE BOAT AND MOTOR MOVER
Morris A. Case, 3725 SW. 170th St., Seattle, Wash.
Filed Nov. 21, 1960, Ser. No. 70,626
8 Claims. (Cl. 280—42)

This invention relates to wheeled carriers for boats and outboard motors and refer more particularly to collapsible devices for the same purposes.

An object of the invention is to provide a wheeled carrier for boats and outboard motors of a collapsible construction which may easily be carried in the hand or transported in a limited space, such as the luggage compartment of an automobile, and which is readily set up for use.

A further object is to provide a collapsible wheeled carrier having a removable cross bar support to which the clamps of an outboard marine motor may be secured for transportation, support or storage.

Another object of the invention is to provide a collapsible wheeled carrier for both boats and motors having a strut construction in the frame thereof whereby the frame may rigidly support the boat or motor, yet readily collapse and fold when not in use.

Another object of the invention is to provide devices for transporting outboard motors and boats of substantial, heavy construction with a minimum of effort, particularly when necessary to transport the boat and motor some distances, as from an automobile, cottage or residence to a body of water.

Another object of the invention is to provide such a mover for boats and motors which is of relatively light weight construction and is inexpensively made of relatively few parts.

Another object of the invention is to provide a collapsible device for aiding in moving a boat which engages the boat transom in moving from a collapsed to an operational state and disengages the boat transom in moving to the collapsed from the operational state.

Another object of the invention is to provide a collapsible boat moving aid which is adapted to particularly facilitate moving of the relatively heavier rear end of an outboard motor boat into the water, the device being applied to the rear end transom before moving the boat into the water, and removed therefrom after the boat is launched, on return to the shore an opposite procedure taking place to aid in removing the boat from the water.

Another object of the invention is to provide a collapsible boat moving device which may be transformed into an outboard motor moving and supporting device by adding a removable rigidifying member thereto.

Another object of the invention is to provide a boat hull moving device which readily handles double hulled boats as well as single hull boats, fixedly grasping such for the moving operation, independent of whether or not the double hull is reinforced at the points of engagement of the boat moving device.

Another object of the invention is to provide a wheeled carriage which may be used to support and move either boat hulls or outboard motors, the height of the carriage when employed for supporting outboard motors adjustable by employing different width supporting members therewith whereby to most conveniently accommodate outboard motors of varying dimensions.

Another object of the invention is to provide a simple wheeled carriage device adapted for carrying or supporting outboard motors in an upright position.

Another object of the invention is to provide a wheeled carriage adapted to aid in transporting outboard motors of various sizes and boats of various sizes, the carriage storable either in collapsed or standing position, the latter permitting immediate application for use.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a rear view of the inventive wheeled carriage in expanded position supporting the rear end of a boat hull, the boat hull shown in dotted lines.

FIG. 2 is a side view of the wheeled carriage of FIG. 1 in place on the boat hull, additionally, a further engagement being provided, particularly adapted for use with double hulled boats.

FIG. 3 is a top view of the wheeled carriage in engagement with the boat hull of FIGS. 1 and 2.

FIG. 4 is a rear view of the construction of FIGS. 1-3, inclusive, in the collapsed position.

Figure 5:
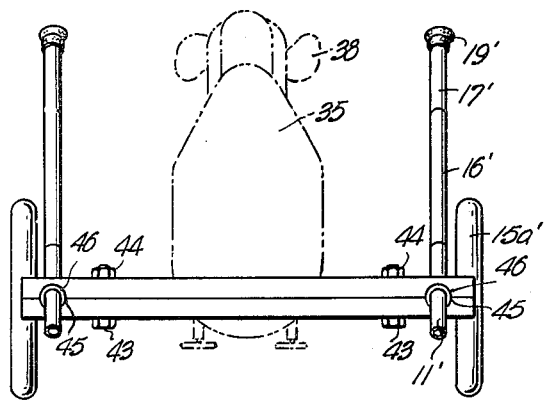
FIG. 5 is a top view of the inventive wheeled carriage with a rigid removable engaging bar attached thereto to permit the mounting of an outboard motor thereon for support, the motor shown in dotted lines.
Figure 6:
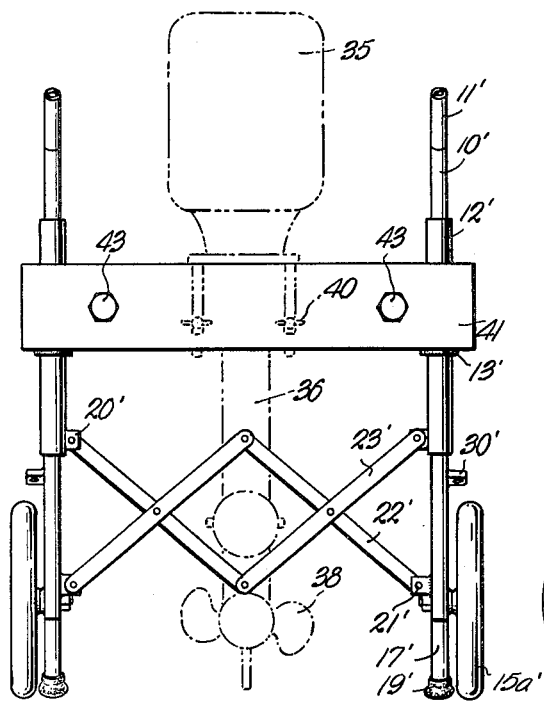
FIG. 6 is a rear view of the construction of FIG. 5 showing the outboard motor mounted on the wheeled carriage with the support legs extended as in FIG. 5.
Figure 7:
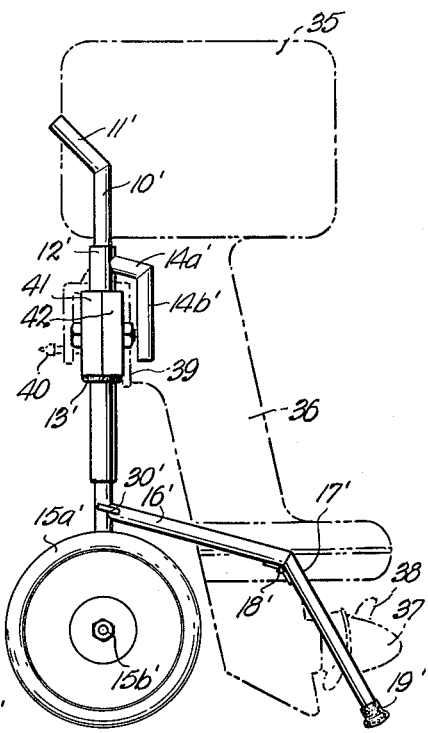
FIG. 7 is a side view of the construction of FIGS. 5 and 6 supporting the outboard motor in the standing position.

FIGS. 1-4, inclusive, show the subject boat and motor support and moving device in application and use as a boat hull moving aid, while FIGS. 5-7, inclusive, show the application as a motor moving device. FIGS. 1-4, inclusive, will be first described. Referring then to FIGS. 1-4, inclusive:

At 10 are shown leg members, preferably comprising cylindrical elongate hollow members of suitably strong metal, such as steel, or aluminum-magnesium alloy, etc., the leg members per se comprising straight pieces. Fixed to the top ends of the leg members 10 are rearwardly angled handles 11 of like material, fastened thereto by welding or other conventional means or processes. Grips may be provided for the handles 11 if desired. Slidably mounted on leg members 10 are cylindrical hollow members or sleeves 12 having such internal diameter as to slidingly yet closely fit on the outside surfaces of leg members 10. Sleeves 12 are preferably metallic and of strength similar to legs 10. The length of sleeves 12 is substantially less than the length of leg members 10 whereby to give a considerable vertical sliding distance thereon. Circumferential stops 13 or buffers 13 may be formed of any suitable resilient material such as rubber or resilient plastic and are positioned intermediate the ends of sleeves 12. Stops 13 are rigidly fixed to the outside surface of sleeves 12. Fixed to the forward (the terms "forward" and "rearward" are used in connection with the instant device and the parts thereof relative to normal forward motion thereof and normal rearward motion thereof, the position of the operator being rearwardly of the device) sides of sleeves 12 are engaging arms 14 including forwardly extending portions 14a which are connected to sleeves 12 at such an angle as to be normally parallel with the ground or wheel supporting surface when the device is in operating position on a boat hull as in FIG. 2 and downwardly extending portions 14b preferably positioned substantially parallel to sleeves 12 and leg members 10. The length of portions 14a and spacing of portions 14b from the sleeves is preferably slightly greater than the greatest boat hull thickness which is to be received between sleeves 12 and arm portions 14b.

Rotatably connected to the lower ends or adjacent the lower ends of leg members 10 are wheels 15 which may have conventional rubber tires 15a thereon, the wheels rotatably mounted on axles 15b connected to legs 10. The wheels are preferably connected to the outer faces or sides of legs 10. Connected to the forward sides of legs 10 below the desired sliding limit extension of sleeves 12 are support bars 16 which may be formed of like tubular metallic material as leg members 10. One end of each bar 16 is welded or otherwise fixedly attached to a forward side of one leg member 10. The angle of connection between members 10 and support bars 16 is slightly greater than 90° whereby bars 16 are substantially parallel to the earth's surface or supporting surface for wheels 15 when the legs 10 are slightly rearwardly canted as in FIG. 2. 105° would be a typical preferred but not limiting angle of attachment between leg members 10 and support bars 16. Optionally, support legs 17 may be pivotally or hingedly fixed to the free ends of support bars 16 by conventional hinge means 18 whereby to provide vertical standing support means for the moving device in the manner of FIG. 7. The length of legs 17 must be such relative to the angle of abutment thereof with the ends of bars 16 as to be able to provide a substantially vertical position of leg members 10 or a slightly forward angling thereof in standing position thereof. Hinges 18 preferably have sufficient frictional resistance therein to retain legs 17 out of the way in folded position. Bumpers or guards 19 may be fitted over the free ends of legs 17.

Interconnecting strut members are provided between the leg and sleeve assemblies whereby to permit sequential collapsing and expanding of the device with concurrent vertical adjustment of arms 14 on sleeves 12 relative to support bars 16. Flanges 20 are provided on the inner sides and adjacent the lower ends of each sleeve 12 while like flanges 21 are provided on the lower inner sides of leg members 10. In both the modification of FIGS. 1-4, inclusive, and that of FIGS. 5-7, inclusive, a diagonal strut arrangement is provided which gives a relatively large available width variation between legs 10 for a relatively small vertical height adjustment of sleeves 12 on legs 10. Thus, one strut member 22 is attached at its lower end to a flange 21 on each leg 10 and at its free end to the other strut member 22. A second strut member 23 is attached at its upper end to a flange 20 on a sleeve 12 and at its lower end to the lower end of the other strut member 23 attached to the other sleeve flange 20. All connections are pivotal through use of conventional pin connectors. Strut members 22 and 23 are also pivotally connected to one another centrally thereof as at 24. One strut member 23 lies in front of its engaged cooperating member 22, while the other strut member 23 lies behind its cooperating strut member 22 whereby to provide a symmetrical, frictionally minimum, engaged array.

Movement of leg members 10 toward one another slides sleeves 12 upwardly on legs 10 whereby to remove arms 14 vertically from fixed bars 16. Contrariwise, movement of legs 10 laterally away from one another slides sleeves 12 downwardly on legs 10, thus moving arms 14 closer to bars 16. Struts 22 and 23, the pin connections therebetween, and the pin connections between flanges 20 and 21 and said strut members must be of sufficient strength and rigidity to resist such twisting and torque moments therearound which may be encountered in hull engaging and moving operations. Preferably, strut members 22 and 23, flanges 20 and 21 and the pivot pins are all made of steel or other strong and stress resistant metals. Stainless steel is a good material for all parts of the device, being rust resistant, as well as of adequate strength.

For use in stabilization of the hulls of larger and heavier boats on the instant device, and also particularly for use in the moving of double hulled boats having spacer means for separating the hulls not necessarily coincident with the engagement zones of the subject device, an additional means may be employed to cooperate with the presence of oarlocks and oarlock fittings in the boat hull. Thus, in a boat hull 25 having sides 26 and stern transom 27, the latter having reduced height coaming 28, oarlock fitting 29 may be provided at each side. Fixed to the outer sides of legs 10 at the same or substantially the same level as bars 16, are flanges 30 having openings 31 therein to receive conventional clips 32 having ropes or cables 33 connected thereto. Alternatively, ropes or cables 33 may be connected to flanges 30 by knots therein. Connected to the opposite ends the cables or connectible therewith are eyelet bolts or like members 34 of such form as to removably fit into the oarlock sockets 29a. The cables thus aid in support of the boat hull on the bars 16 in contact with arms 14b on sleeves 12.

In operation of engagement of the inventive boat moving device with the stern of a boat hull, with the device in the position of FIG. 4, sleeves 12 are at an uppermost position with arms 14 thereon separated a maximum distance from bars 16. The device may be engaged with the stern transom by fitting the arm members 14b down inside the hull with portions 14a overlying the top of transom 28. Legs 10 are then separated laterally whereby to draw down the sleeves on the legs or, conversely, the legs upwardly within the sleeves whereby the bars 16 abut the bottom of the hull. As an extra securement, cables 33 may be engaged with oarlock sockets 29a by insertion of eyelet bolts 34 therein, whereby to fixedly position the stern of the boat hull on the moving device. The boat is then pushed stern first into the water, the heavy stern carried on the wheeled moving device. The operator then may mount over the bow of the boat after the wheeled device is free of the bottom.

Once the boat is launched and the wheeled device is free of contact with the bottom, cables 33, if used, may be released by removal of eyelet bolts 34 from oarlock sockets 29a and, then, by moving legs 10 toward one another, sleeves 12 are moved upwardly on legs 10 whereby to permit disengagement of the device from the stern transom of the boat by simple upward lifting, canting the lower end of the wheeled device away from the boat hull. The device may then be stored in the bottom of the boat for reinsertion on the rear end of the boat before landing or it may be returned to shore over the bow. In landing, an inverse operation is employed with the device in the collapsed position of FIG. 4 fitted down over the stern transom and then legs 10 spread to engage the bars 16 with the bottom of the hull. Cables 33 may then be applied, if desired. With the boat run bow first to the shore, the operator may disembark over the bow and then pull the boat on shore with the stern supported by the device.

Referring to FIGS. 5-7, therein is shown a modified use of the instant structure when it is desired to support and/or move an outboard motor. In this set of figures, identical structure is shown to that of FIGS. 1-4, except for the provision of spacing and engaging means for fixing the sleeves laterally relative to one another. Therefore, all parts which are identical to those of FIGS. 1-4, inclusive, will be numbered the same, but primed.

In dotted lines in FIGS. 5-7, there is shown schematically a conventional outboard motor having a motor and fuel tank section 35, a drive shaft tunnel 36 and propeller hub 37 mounting propeller 38. The motor has a conventional boat transom engaging frame 39 with screw members 40 adaptable to clamp the frame on a boat stern transom.

To transform the inventive boat moving device into a motor supporting and moving device, a rigid, preferably removable, transverse support member or bar must be provided operable to rigidly engage the two sleeves 12' at a fixed lateral spacing. Such engagement also fixes the vertical spacing of the sleeves on the legs 10'. Optimally, the preferred vertical spacing of the sleeves on the legs would be that spacing which would abut the lower ends of the sleeves on the bars 16' whereby to give additional rigidity to the frame. However, since a variety of motors of various shapes, sizes and lengths may be mounted on the device, the specific application illustrated shows sleeves 12' at an intermediate height position on legs 10'. Additionally, the motor support member for the device preferably is substantially of the same thickness as a typical boat transom on which the motor would be mounted, for convenience in mounting the motor on the support member and engagement and disengagement therewith. Also preferably, the support member is of sufficient height to permit use of transom engaging screws as 40 but also to give a sufficiently elongate grip on sleeves 12' to spread stress and strain on the member itself and sleeves due to the support of extremely heavy motors.

A typical operable support member adapted for such described use comprises a pair of rectangular boards 41 and 42 of wood, plastic or metal, said boards preferably rectangular on all side dimensions. Boards 41 and 42 have half cylindroid recesses 45 and 46 formed on the inner faces thereof adjacent the ends thereof at a desired spacing whereby to fit over sleeves 12 in tight frictional engagement with the inner faces of boards 41 and 42 in tight abutment with one another when tightened down by suitable and conventional bolt and nut assemblies 43 and 44. Additional extra recesses (not shown) may be formed inwardly of the bolt connections whereby to provide a secondary engagement position with sleeves 12 if a higher motor mounting is desired. Buffers 13' may serve as a convenient rest and base for the undersides of board members 41 and 42. Removal of the motor support connection by removal of the bolt and nut assemblies permits the reconversion of the unit into the boat moving device. As may be seen in FIG. 7, the motor stand may be used as a more or less permanent support or temporary rest by folding out of legs 17'.

Figure 8:
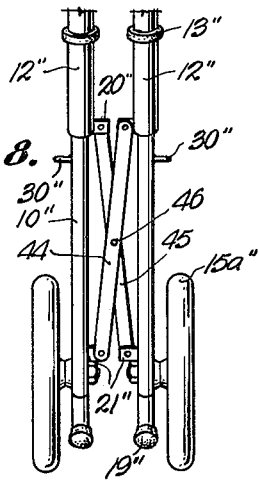
FIG. 8 is a fragmentary view like FIG. 4 showing a rear view of a modified form of the device of FIGS. 1-4, inclusive.

Referring to FIG. 8, therein is shown a modification of the construction of FIGS. 1-4, inclusive, which is identical in all respects to the latter structure with the exception of the interconnecting strut members between the leg and sleeve assemblies. Therefore, parts idntical in the apparatus of FIG. 8 to the apparatus of FIGS. 1-4, inclusive, are numbered the same but double primed. The diagonal strut arrangement provided gives a relatively smaller available width variation between legs 10" for a given vertical height adjustment of sleeves 12" on legs 10" compared to the structure of FIGS. 1-4. One strut member 44 is attached at its lower end to a flange 21" on leg 10" and at its upper end to a flange 20" on the opposite sleeve 12". Second strut member 45 is connected to the other leg flange 21" at its lower end and at its upper end to the opposite sleeve 12", by flange 20". The sleeve and leg connections are pivotable and the strut members are pivotally connected centrally as at 46. Strut 44 connects to the rear faces of its flanges 21" and 20", while strut 45 is connected to the front sides of its flanges 21" and 20". The operation of the modification of FIG. 8 is identical to that of the modification or FIGS. 1-4, inclusive, except for the differing ratios of leg spread versus sleeve vertical movement. A cable auxiliary attachment may be employed with this modification as well as the former modification utilizing 30" thereon. This form is particularly adapted to boat hulls of relatively lesser width.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it will be understood that all matter herein set forth or shown in the accompanying drawings is to be interpreted as illustrative and not in a limiting sense.

Having thus described my invention, I claim:

1. A moving device comprising a pair of leg members, a pair of wheels, one fixed rotatably to the lower end of each of said leg members, a pair of sleeves, one slidably mounted on each of said leg members, transverse diagonal strut members connecting between the leg members and sleeves, one transverse diagonal strut member pivotally connected to each leg member adjacent the lower end thereof and to the sleeve on the opposite leg member, said strut members pivotally connected to one another centrally, an engaging arm fixed to each sleeve and extending forwardly and downwardly substantially parallel relative thereto, a support bar fixed to each leg member below the sleeve thereon and extending forwardly thereof and at a substantial angle thereto.

2. A moving device as in claim 1 including a ground engaging leg portion pivotally fixed to each supporting bar and pivotable from a ground engaging position supporting the device in substantially vertical position to a nonsupport position.

3. A moving device comprising a pair of leg members, a pair of wheels, one fixed rotatably to the lower end of each of said leg members, a pair of sleeves, one slidably mounted on each of said leg members, transverse diagonal strut members connecting between the leg members and the sleeves, one transverse diagonal strut member pivotally connected to each leg member adjacent the lower end thereof, another transverse diagonal strut member pivotally connected to each sleeve adjacent the lower end thereof, each pair of strut members connected to each leg member and the sleeve carried thereby pivotally connected to one another centrally thereof and at their free ends to the ends of the other pair of strut members, an engaging arm fixed to each sleeve above said transverse diagonal strut member connection and extending forwardly and downwardly substantially parallel relative thereto, and a support bar fixed to each leg member and extending forwardly thereof and at a substantial angle thereto.

4. A moving device comprising a pair of leg members, a pair of wheels, one wheel fixed rotatably to the lower end of each of said leg members, a pair of sleeves, one slidably mounted on each of said leg members, a support bar fixed to each leg member below the sleeve thereon and extending forwardly thereof at a substantial angle thereto, transverse diagonal strut members connecting between the leg members and sleeves whereby motion of the sleeves upwardly on said leg members tends to move the leg members together and motion of the sleeves downwardly on said leg members tends to move the leg members further apart, and removable rigid means communicating between said sleeves for fixing said sleeves in vertical and lateral relationship and position relative to one another connected thereto.

5. A device as in claim 4 including a ground engaging leg portion pivotally fixed to each support bar movable from a ground engaging position supporting the leg members in substantially vertical position to a folded position.

6. A device as in claim 1 including a connecting means on each leg member, cable means connected at one end thereof to each said connecting means and means for connecting each said cable to a portion of said boat hull.

7. A device as in claim 3 including a connecting means on each leg member, cable means connected at one end thereof to each said connecting means and means for connecting each said cable to a portion of a boat hull.

8. A moving device comprising a pair of leg members, a pair of wheels, one wheel fixed rotatably to the lower end of each of said leg members, a pair of sleeves, one sleeve slidably mounted on each of said leg members, transverse diagonal strut members connecting between said leg members and sleeves thereon whereby upward movement of the sleeves on the leg members moves the said leg members closer together and downward movement of the sleeves on said leg members moves the leg members further apart, an engaging arm fixed to each sleeve and extending forwardly and downwardly substantially parallel relative thereto, a support arm fixed to each leg member below the sleeve thereon and extending forwardly thereof and at a substantial angle thereto, and a ground engaging leg portion pivotally fixed to each support arm and movable from a ground engaging position supporting the device in a vertical standing position to a folded position.

References Cited in the file of this patent

UNITED STATES PATENTS

| | | |
|---|---|---|
| 1,919,103 | Dolge | July 18, 1933 |
| 2,551,040 | Newell | May 1, 1951 |
| 2,695,109 | Pringle | Nov. 23, 1954 |
| 2,903,147 | Davis | Sept. 8, 1959 |

FOREIGN PATENTS

| | | |
|---|---|---|
| 291,239 | Great Britain | May 31, 1929 |